Feb. 7, 1933. R. E. KIMBALL 1,896,709
ADVERTISING DEVICE
Filed April 14, 1932
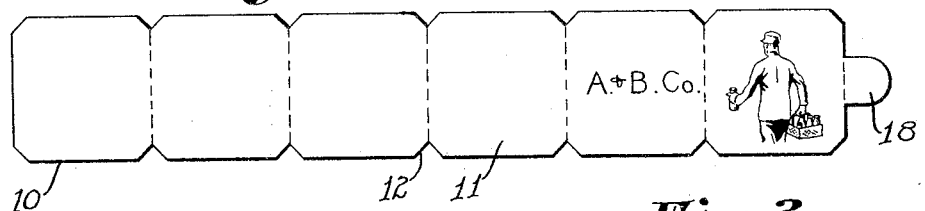
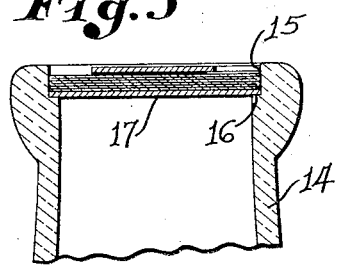
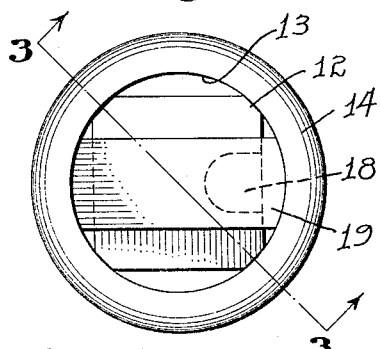
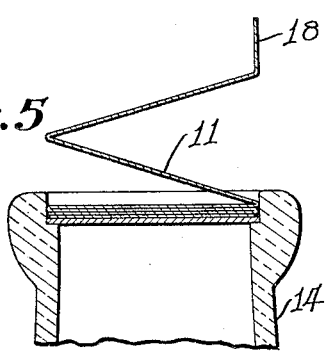
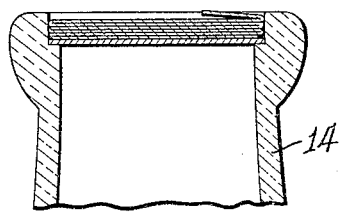
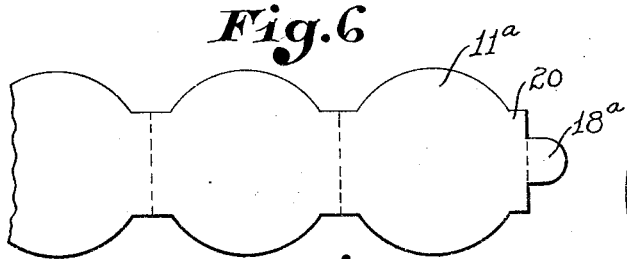
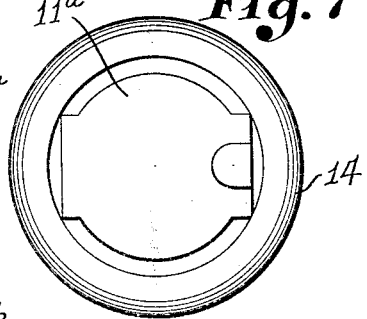
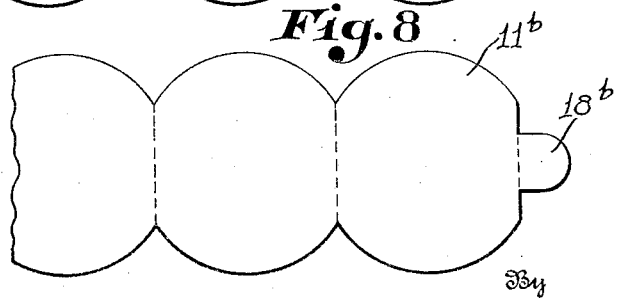
Inventor
Richard E. Kimball
Owen & Owen
By
Attorneys Patented Feb. 7, 1933

1,896,709

UNITED STATES PATENT OFFICE

RICHARD E. KIMBALL, OF TOLEDO, OHIO, ASSIGNOR OF ONE-HALF TO KENNETH P. MacNAUGHTON, OF DETROIT, MICHIGAN

ADVERTISING DEVICE

Application filed April 14, 1932. Serial No. 605,232.

This invention relates to advertising devices, but more particularly to devices for the dissemination of sales and advertising literature, or other forms of printed matter, by using, as a medium, the distribution of containers to residences and other consumers, as for example, the distribution of milk and cream, and an object is to produce a device of this character which is simple in construction, inexpensive to manufacture, easy to apply, and has the new and improved features of construction and operation hereinafter described.

For purposes of illustration, but not of limitation, embodiments of the invention are shown on the accompanying drawing, in which:

Figure 1 is a plan view of a device, in unfolded position, for application to milk and cream bottles;

Figure 2 is a top plan view of the upper end of a bottle with the folder in position, and a seal for insuring retention of the folder in place;

Figure 3 is a vertical sectional elevation on the line 3—3 of Figure 2;

Figure 4 is a view similar to Figure 3 with the sealing strip omitted, the folder being held in place by frictional contact;

Figure 5 is a view similar to Figure 4 showing the manner in which the folder is progressively withdrawn from the bottle to display the leaves one by one;

Figure 6 is a plan view of another form of folder in which the sections are rounded on opposite sides;

Figure 7 is a top plan view of a bottle in which is disposed a folder shown in Figure 6; and Figure 8 is a plan view of another form of folder which is adapted to fit snugly within the bottle.

The illustrated embodiment of the invention, as shown in Figure 1, comprises a strip 10 of paper, or other suitable flexible material, having a plurality of sections or panels 11, which are formed into an accordion fold, as shown in Figures 3, 4 and 5. Between adjacent sections diagonal cuts are made to provide corners 12, which, when the strip is folded, are in registration. As shown in Figure 2, after the strip is folded it is inserted inside the mouth 13 of an ordinary milk or cream bottle 14. The bottle 14 is of the usual construction and has a continuous annular recess 15 and a ledge 16, on which the usual cap 17 seats.

In this instance the various panels or sections of the strip 10 are of sufficient size that when folded their widest diameter is only slightly greater than the inside diameter of the recess 15. When inserted into the recess, the corners 12 frictionally engage the side walls of the recess and retain the folder in position. Integral with the uppermost leaf or panel of the folder is a tab or flap 18, which is grasped to remove the folder. The frictional engagement between the folder and the side walls of the recess is such that when the tab 18 is pulled to remove the folder, the leaves or panels 11 successively unfold, as indicated in Figure 5.

Any suitable printed matter may be displayed on the leaves of the folder, as for example, recipes, pictures, stamps, coupons, or any desired sales or advertising ideas. It is apparent that during withdrawal of the folder from the bottle the several panels are successively displayed owing to the serpentine arrangement of the folding, and, inasmuch as the folder must be completely withdrawn before the cap 17 is accessible, the full message or printed matter is rendered visible. Thus, instead of the folder being completely withdrawn as a unit, the customer will see the entire printed matter on the folder because of the manner of unfolding the leaves or panels, showing one after the other the various leaves. If desired the printed matter may be so displayed on the several leaves, that as the device is unfolded, the matter will be visible in continuity, as for example the words of sentence or sentences being displayed over a series of leaves and readable as the unfolding progresses.

As shown in Figures 2 and 4, the flap 18 folds flatly against the outside of the adjacent leaf, and, if desired, a strip 19 may be placed over the folder to insure more positively its retention in the mouth of the bottle.

While this seal may be of any desired construction, in this instance it comprises a relatively narrow strip of cardboard, the ends of which are shaped to engage the side walls of the recess 15. The strip 19 is slightly wider than the diameter of the recess in order to frictionally engage the side walls sufficiently to retain the same in position.

The shape of the individual leaves of the folder may be varied, and, as shown in Figure 6, the leaves 11ª are rounded on opposite sides to conform generally to the shape of the inside diameter of the recess, but are of less diameter than the diameter of the recess 15. These panels are retained in place by frictional engagement between the pointed corners 20 and the side walls of the recess 15, four corners 20 being provided for this purpose.

If desired, the panels may conform to the shape of the recess 15, and, as shown in Figure 8, the leaves 11ᵇ have oppositely curved sides 21, which engage the side walls of the recess 15, the width of each leaf being slightly greater than the diameter of the recess 15 to retain the folder in place. Both the forms shown in Figures 5 and 8 have tabs or flaps 18ª and 18ᵇ respectively, similar to the tab 18 above described.

It is manifest that the above described folder will readily present to the various customers the message desired with no additional cost for distribution. It enables the presentation at frequent and regular intervals, and, as directly and inexpensively as possible a continuous series of printed folders, containing printed matter which may be interesting, instructing, entertaining, or beneficial to all members of the household. The miniature pages of the folders afford ample space for displaying a forceful message, or any sales or advertising ideas, or for numerous other purposes of definite interest and importance to both children and adults. The folders are particularly of importance to stimulate the sales of dairy products, cereals, coffee, cocoa, bread, and other products intimately associated with the use of milk, cream, etc.

It is to be understood that the above description is to be considered merely as illustrative, and not as limiting, and numerous changes in details of construction, arrangement, and choice of materials may be effected without departing from the spirit of the invention, especially as defined in the appended claims.

What I claim is new and desire to secure by Letters Patent is:

1. A device of the class described comprising in combination with a container having a recess adjacent the mouth thereof providing a ledge, a cap on said ledge frictionally engaging the side walls of said recess, a folder having accordion plaits seating on said cap and in contact with the side walls of said recess, a tab on the uppermost leaf of said folder, whereby the folder is progressively unfolded during removal, and a strip disposed across said folder and in frictional engagement with the side walls of said recess for retaining the folder in place.

2. In combination with a container having a mouth and an internal recess adjacent said mouth, a folder in said recess having portions of slightly greater width than the diameter of said recess, thereby to frictionally retain same in place, said folder comprising a plurality of leaves, a tab on the outermost leaf, and a strip disposed across said folder holding said flap in folded position against said outermost leaf, said strip being of a length slightly greater than the diameter of said recess thereby frictionally to retain same in place.

3. In combination with a container having a mouth, a continuous internal recess spaced inwardly from the mouth, a ledge, and a closure cap seating on said ledge and frictionally engaging the side wall thereof, a separate paper folder disposed in said recess above said cap, said folder having accordion plaits each of which frictionally engages the side walls of said recess, a pull tab on the uppermost leaf of said folder, and printed matter on said folder, the construction and arrangement being such that the folder is gradually unfolded during withdrawal from the container for gradually revealing the printed matter thereon.

In testimony whereof I have hereunto signed my name to this specification.

RICHARD E. KIMBALL.